United States Patent
Hendriks (10) Patent No.: US 7,619,339 B2
(45) Date of Patent: Nov. 17, 2009

(54) FLUID DYNAMIC BEARING ASSEMBLY FOR DIRECTING BUBBLES

(75) Inventor: Ferdinand Hendriks, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 587 days.

(21) Appl. No.: 11/329,593

(22) Filed: Jan. 10, 2006

(65) Prior Publication Data

US 2007/0159019 A1 Jul. 12, 2007

(51) Int. Cl.
*H02K 5/16* (2006.01)
*H02K 7/08* (2006.01)
*F16C 32/06* (2006.01)

(52) U.S. Cl. .............. 310/90; 384/902; 384/279; 384/114; 384/120; 360/99.08

(58) Field of Classification Search ................. 310/90; 360/98.07, 99.04, 99.08; 384/902, 279, 114, 384/120, 113
See application file for complete search history.

(56) References Cited

U.S. PATENT DOCUMENTS

| | | | |
|---|---|---|---|
| 3,497,273 A | 2/1970 | Muijderman et al. | |
| 5,112,141 A | 5/1992 | Asada et al. | |
| 5,516,212 A | 5/1996 | Titcomb | |
| 6,034,454 A | 3/2000 | Ichiyama | |
| 6,749,339 B1 | 6/2004 | Murabe et al. | |
| 6,768,236 B2 | 7/2004 | Tokunaga et al. | |
| 2003/0174915 A1 | 9/2003 | Parsoneault et al. | |
| 2004/0070298 A1* | 4/2004 | Aiello et al. | ................... 310/90 |

FOREIGN PATENT DOCUMENTS

| | | |
|---|---|---|
| JP | 62246619 | 10/1987 |
| JP | 2001140865 | 5/2001 |
| JP | 2001140867 | 5/2001 |
| JP | 2003130042 | 5/2003 |
| JP | 2003139130 | 5/2003 |
| JP | 2004052987 | 2/2004 |
| JP | 2004183766 | 7/2004 |

* cited by examiner

*Primary Examiner*—Quyen Leung
*Assistant Examiner*—David W. Scheuermann (57) ABSTRACT

The present invention pertains to a fluid dynamic bearing assembly for directing bubbles. The assembly includes a stator with a stator bearing surface. A rotor with a rotor bearing surface rotates with respect to the stator such that the rotor bearing surface opposes the stator bearing surface. Lubricating fluid is disposed between the stator bearing surface and the rotor bearing surface. Features disposed on either the stator bearing surface or the rotor bearing surface direct the bubbles such that the fluid dynamic bearing assembly does not require a recirculation channel.

17 Claims, 7 Drawing Sheets

FLUID DYNAMIC BEARING ASSEMBLY FOR DIRECTING BUBBLES

TECHNICAL FIELD

The present invention relates to the field of hard disk drive development, and more particularly to a fluid dynamic bearing assembly and surface for directing bubbles.

BACKGROUND ART

Hard disk drives (HDDs) are used in almost all computer system operations. In fact, most computing systems are not operational without some type of HDD to store the most basic computing information such as the boot operation, the operating system, the applications, and the like.

The basic HDD model was established approximately 50 years ago and resembles a phonograph. That is, the HDD model includes a hard disk that is spun by a spindle motor at a standard rotational speed. An actuator moves an attached actuator arm over the spinning hard disk. A suspension arm attached to the actuator arm carries a slider. The slider carries a head assembly that includes a magnetic read/write transducer or head for reading/writing information to or from any desired location on the hard disk.

In operation, the hard disk is rotated at a set speed via a spindle motor assembly having a central drive hub. Additionally, there are tracks evenly spaced at known intervals across the hard disk. When a request for a read of a specific portion or track is received, the HDD aligns the head over the specific track location via the actuator arm. Once aligned, the head reads the information from the hard disk. In the same manner, when a request for a write of a specific portion or track is received, the HDD aligns the head over the specific track location and the head writes the information to the hard disk.

Over the years, HDDs have undergone great reductions in size and increases in hard disk rotation speed driven by the need for smaller HDDs used in such devices as personal digital assistants (PDAs), MP3 players, and the like. For example, some of the early HDDs had disk diameters of 24 inches and hard disk rotation speeds of only 1200 rpm, whereas some of the modern disk drives have disk diameters of less than an inch and hard disk rotation speeds of 15,000 rpm. And given the need to maximize the storage capacity of HDDs, the track spacing has also decreased over the years.

As hard disks decrease in size and are required to rotate at higher speeds, problems arise that affect HDD performance, such as non-repeatable runout (NRRO), reliability problems, and acoustical noise problems. NRRO in combination with decreased track spacing can result in track mis-registration. Reliability and acoustical noise are also important issues, especially as the HDDs make their way into smaller consumer devices.

Initially these issues were addressed by replacing the ball bearing spindle motors with fluid dynamic bearing (FDB) spindle motors. Under optimal operating conditions, FDBs used in HDDs produce about 0.01 micro-inches of NRRO, which is about one-tenth the amount produced by similar ball bearings. FDBs are also more reliable and produce less acoustical noise given that there is no metal-to-metal contact between the rotor and stator, as is the case with ball bearing-based spindle motors.

Figure 2:
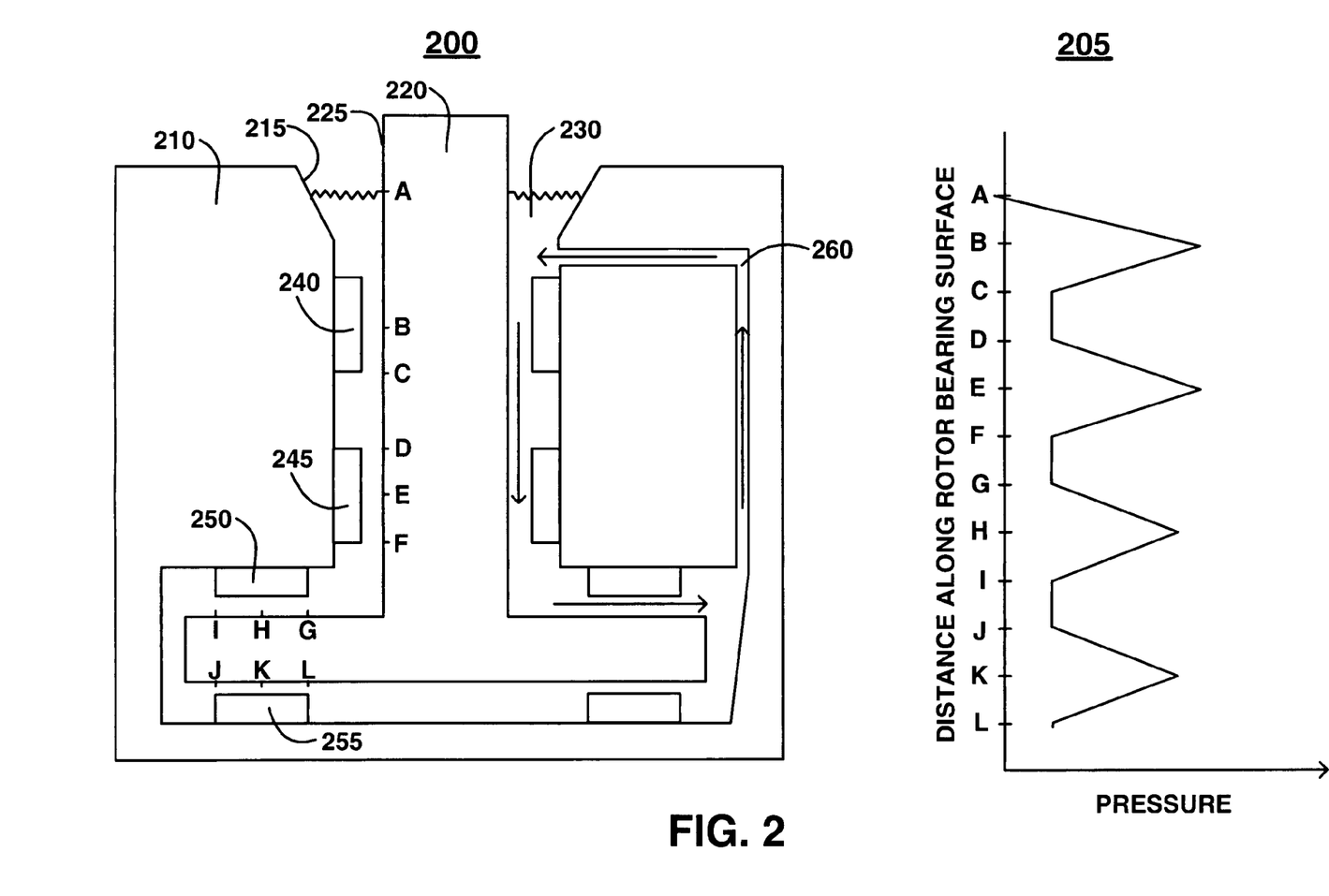
FIG. 2 is a cross-sectional view of a typical background fluid dynamic bearing (FDB) and a graph of the pressures generated in the lubricating fluid along the rotor bearing surface of the rotor.
Figure 5:
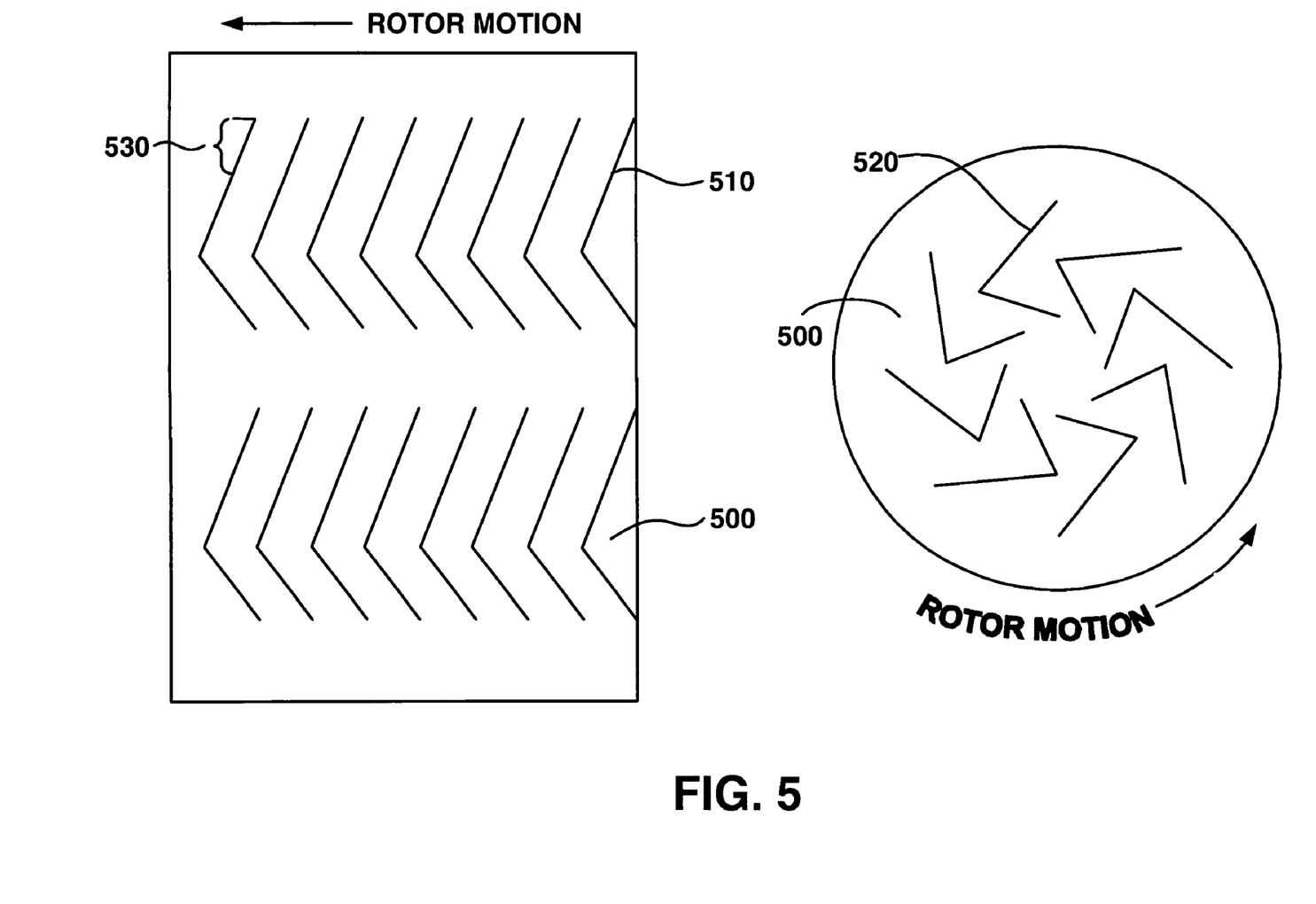
FIG. 5 is a projected view of a background journal bearing surface, and a top view of an upper and lower background thrust bearing surface.

FDBs rely upon the pressures generated in the lubricating fluid by the rotation of the rotor with respect to the stator to stabilize and support the rotor during operation. FIG. 2 shows a typical prior art FDB 200 and the pressures generated in lubricating fluid 230 along rotor bearing surface 225 of rotor 220, as shown in graph 205. The fluid gaps between rotor bearing surface 225 and stator bearing surface 215 are shown vastly magnified for clarity. The pressures within the lubricating fluid are generated by grooves on stator bearing surface 215 of stator 210, which are arranged to form individual bearings that are fluid dynamically coupled. FDBs typically consist of two journal bearings and two thrust bearings. FDB 200 has upper journal bearing 240, lower journal bearing 245, upper thrust bearing 250, and lower thrust bearing 255. Both the journal and thrust bearings use herringbone grooves, as shown in FIG. 5. Both journal bearing grooves 510 and thrust bearing grooves 520 are disposed on stator bearing surface 500.

Since FDBs rely upon the lubricating fluid to supply the pressures needed to operate, voids or bubbles in the lubricating fluid reduce the stiffness of the bearing. This reduced stiffness can lead to excessive repeatable and non-repeatable runout in the FDB, and possibly even FDB failure. The voids or bubbles may enter the fluid through such means as cavitation, gases coming out of solution, or by air being drawn into the lubricating fluid by the nature of the fluid flow within the bearing. As such, these bubbles or voids may be composed of air, oil vapor, or other gases.

Previously, efforts to remove bubbles from the lubricating fluid involve the use of a recirculation channel. As shown in FIG. 2, the features disposed on stator bearing surface 215 create an axial flow through the journal bearings, upper thrust bearing, and recirculation channel 260, as indicated by the arrows. This axial flow is generated by unbalance section 530 of journal bearing grooves 510, as shown in FIG. 5, and helps some bubbles overcome the pressure gradients that would otherwise trap them. For example, as shown in FIG. 2, any bubbles drawn within regions B to L would ordinarily be trapped in an area of low pressure, such as from point C to point D, from point F to point G, from point I to point J, or at point L.

However, the use of recirculation channels is not without significant drawbacks. For example, recirculation channels are unable to completely purge all trapped air bubbles. As shown in graph 205, pressure gradients still remain within the lubricating fluid that trap smaller bubbles. Also, bubbles may still congregate around the lower thrust bearing as there is no axial flow in this region. Moreover, recirculation channels add significant manufacturing cost to the FDB, and consequently, to all products incorporating the FDB. Therefore, a need exists to more effectively and economically drive bubbles within the lubricating fluid to a desired location that is less detrimental to the performance of the FDB.

SUMMARY

The present invention pertains to a fluid dynamic bearing assembly for directing bubbles. The assembly includes a stator with a stator bearing surface. A rotor with a rotor bearing surface rotates with respect to the stator such that the rotor bearing surface opposes the stator bearing surface. Lubricating fluid is disposed between the stator bearing surface and the rotor bearing surface. Features disposed on either the stator bearing surface or the rotor bearing surface direct the bubbles such that the fluid dynamic bearing assembly does not require a recirculation channel.

BRIEF DESCRIPTION OF DRAWINGS

Background

Background

DETAILED DESCRIPTION OF THE EMBODIMENTS

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail so as not to unnecessarily obscure aspects of the present invention.

The discussion will begin with an overview of a fluid dynamic bearing (FDB) in conjunction with its operation within a hard disk drive (HDD) and components connected therewith. The discussion will then focus on embodiments of a FDB assembly and surface for directing bubbles trapped within the lubricating fluid to a location less detrimental to the performance of the FDB.

Figure 1:
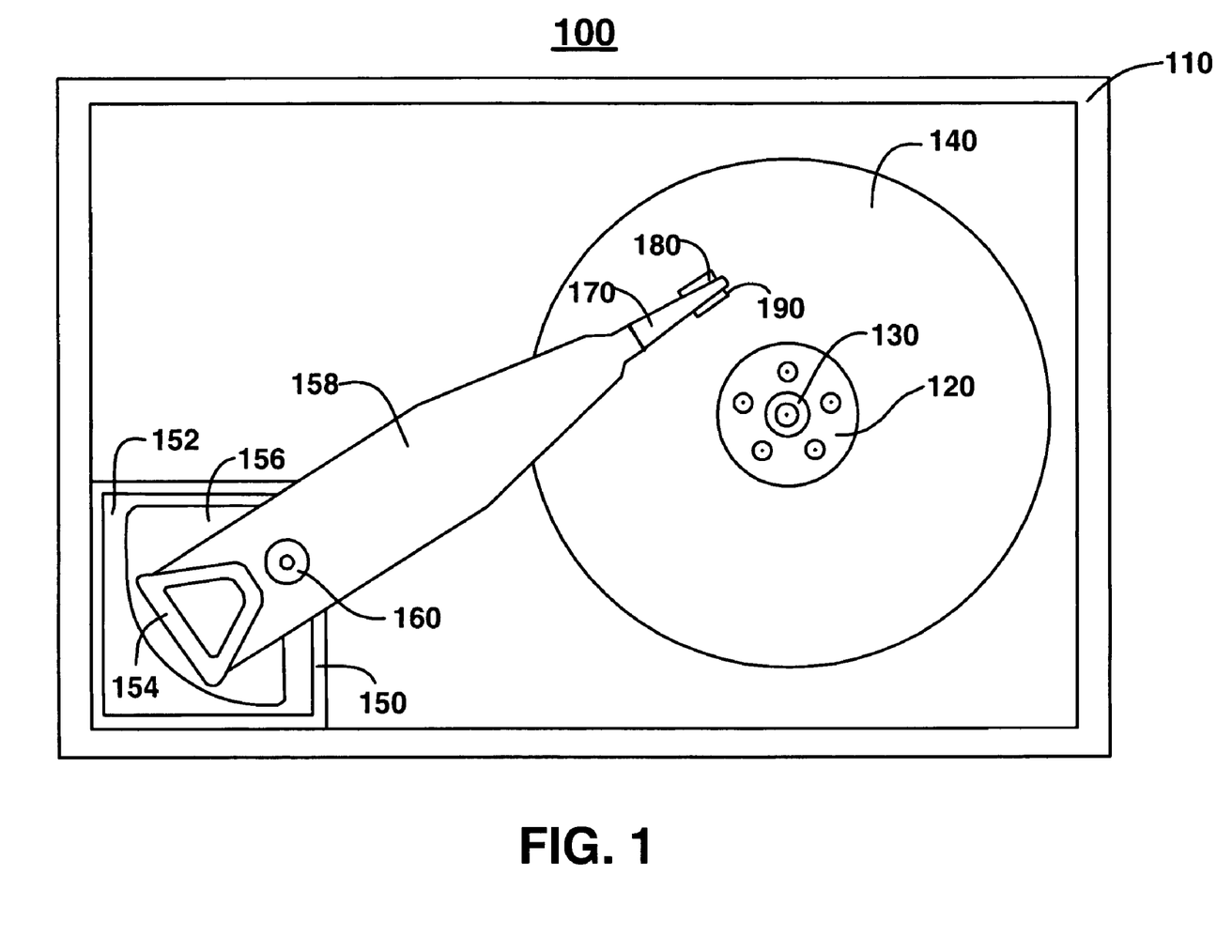
FIG. 1 is a schematic top plan view of a hard disk drive in accordance with one embodiment of the present invention.

Since their inception, hard disk drives have been comprised of the same basic components, as shown in FIG. 1. HDD 100 is enclosed within a housing 110. Central drive hub 120 is coupled with the housing 110 via a spindle motor 130. Spindle motor 130 of the present embodiment incorporates a FDB, which is not shown in FIG. 1. Hard disk 140 is comprised of one or more disks and is typically arranged in a stacked configuration. The hard disk 140 is coupled with the central drive hub 120 and rotated by spindle motor 130. Actuator assembly 150 is mounted to housing 110, and comprises controller 152, voice coil 154, and conventional voice coil motor magnet assembly 156 (top pole not shown). Voice coil 154 is coupled with actuator arm 158, such that controller 152 can rotate actuator arm 158 about pivot assembly 160. Actuator arm 158 is coupled with suspension arm 170, which is coupled with slider 180, which is coupled with read/write head element 190. Thus, as controller 152 rotates actuator arm 158, read/write head element 190 is moved over hard disk 140 allowing HDD 100 to read/write information to or from any desired location on hard disk 140.

Figure 3:
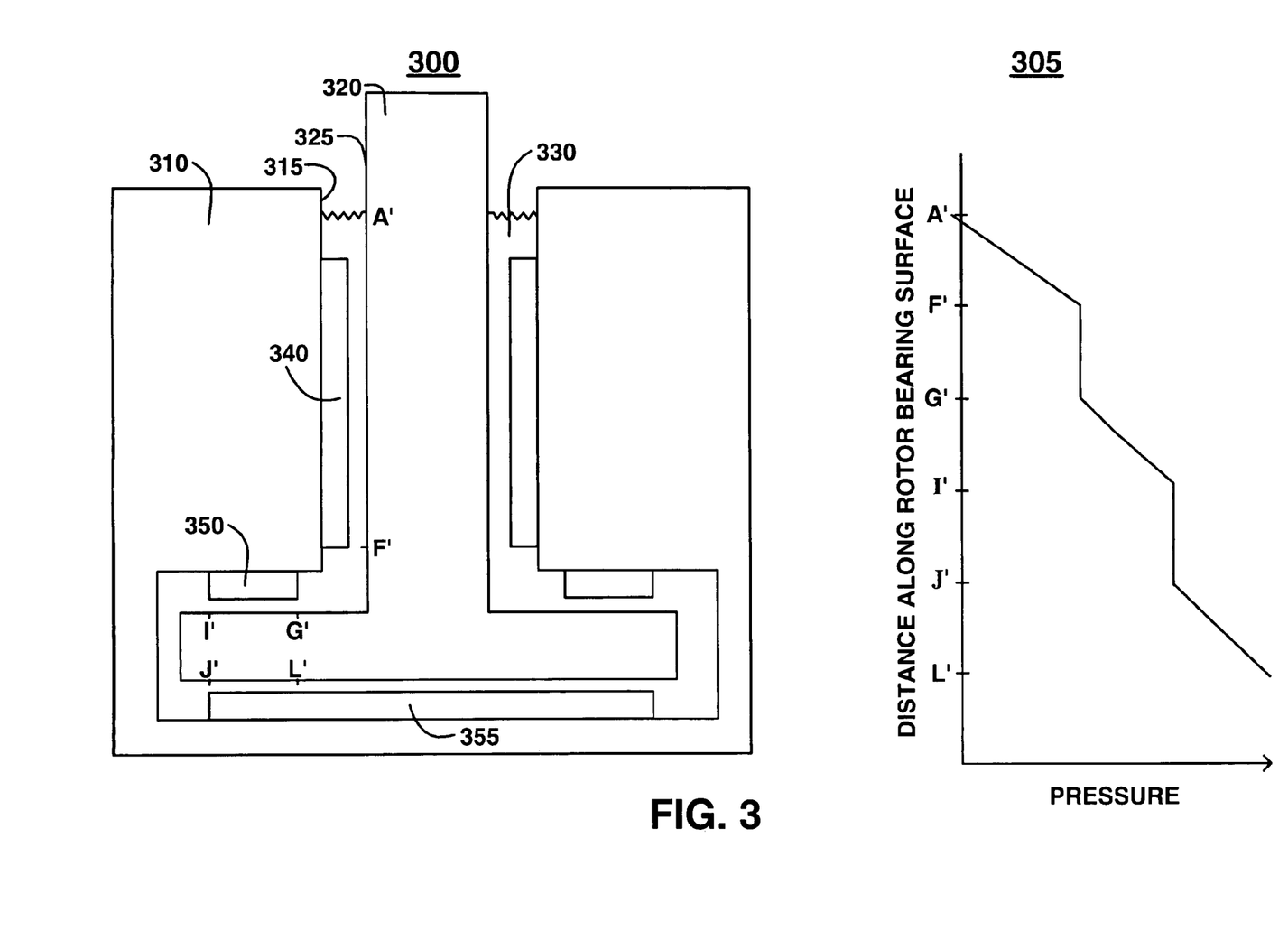
FIG. 3 is a cross-sectional view of a FDB and a graph of the monotone pressure gradient generated in the lubricating fluid along the rotor bearing surface of the rotor in accordance with one embodiment of the present invention.

FIG. 3 shows FDB assembly 300, which is coupled with the hard disk of the HDD. The present embodiment shows stator 310 with stator bearing surface 315. Rotor 320 rotates with respect to stator 310, and has rotor bearing surface 325. Lubricating fluid 330 is disposed between the opposing stator bearing surface 315 and rotor bearing surface 325. The present embodiment shows features disposed on the stator bearing surface to form journal bearing 340, upper thrust bearing 350, and lower thrust bearing 355. However, in another embodiment, the features could be disposed on rotor bearing surface 325. The features disposed on stator bearing surface 315 or rotor bearing surface 325 create pressure gradients within lubricating fluid 330, as shown in graph 305. These pressure gradients are formed by the rotation of rotor 320 causing lubricating fluid 330 to flow past the features. As a result, the pressures within lubricating fluid 330 exert forces on the spinning rotor 320 to keep rotor 320 suspended within stator 310, thereby preventing rotor 320 from coming into contact with stator 310. Moreover, the pressures provide stiffness during operation and minimize runout, such that HDD performance is maximized.

Figure 4:
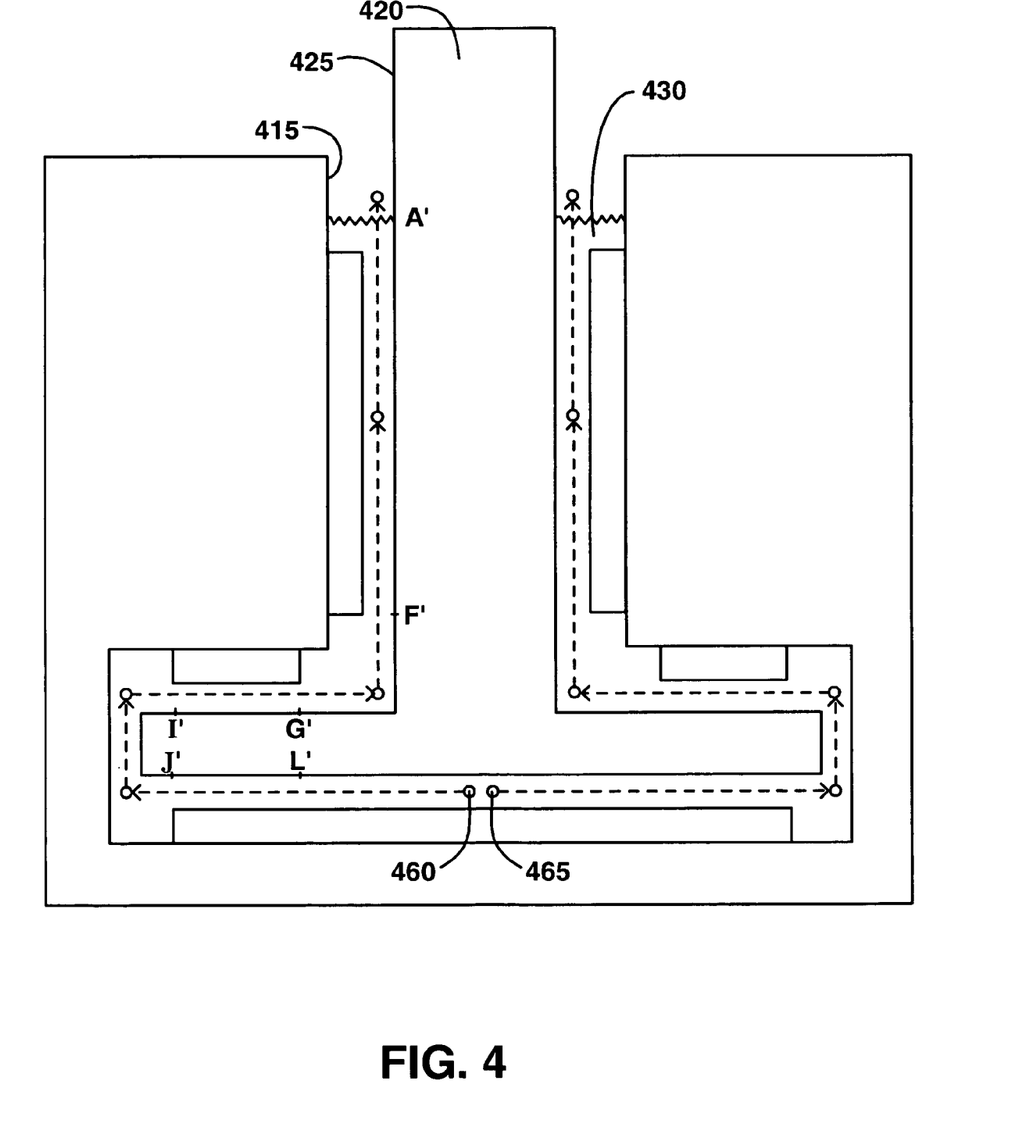
FIG. 4 is a cross-sectional view of a FDB showing the path a bubble would travel in the lubricating fluid in accordance with one embodiment of the present invention.

Given the need to maximize stiffness of the FDB to minimize repeatable and non-repeatable runout, bubbles larger than the height of the features within the lubricating fluid should be directed to a location that is less detrimental to FDB stiffness, such as a lubricating fluid-air interface. Although bubbles smaller than the height of the features tend to remain with the lubricating fluid, these bubbles are much less detrimental to FDB performance given that they occupy a very small volume. As shown in FIG. 4, bubble 460 of the present embodiment should be directed out of lubricating fluid 430 toward the lubricating fluid-air interface at Point A'. Since lubricating fluid 430 surrounds rotor 420, bubble 465 would travel a similar path up the other side of the rotor toward the lubricating fluid-air interface. Point A' is the least detrimental location of the present embodiment as no other paths out of the lubricating fluid are shown. However, in other embodiments, vents may be placed along either stator bearing surface 415 or rotor bearing surface 425 to remove bubbles from the lubricating fluid. It should be understood that vents are distinguishable from recirculation channels, as vents may purge bubbles from the lubricating fluid without requiring fluid flow. For example, a vent at Point F' may present significant advantages, as the distance that bubble 460 must travel is nearly cut in half. Instead of bubble 460 having to travel from Point L' to Point A' in the pictured embodiment, an embodiment with a vent at Point F' would require bubble 460 to only travel from Point L' to Point F'. And in other embodiments, vents may be placed anywhere along either stator bearing surface 415 or rotor bearing surface 425. In these other embodiments, the features would be arranged between the vents such that bubbles would be directed to the vents and out of the lubricating fluid via the pressure gradients.

In general, bubbles move from areas of higher pressure to areas of lower pressure. This pressure gradient within the fluid may be created by gravity, as is the case with bubbles in a soda or beer. The pressure is higher at the bottom of the glass, so bubbles float from the bottom to the top of the soda or beer. Higher pressures within the fluid may also be caused by the fluid flowing around a given feature. Since the FDB clearances within a HDD are small, the effects of gravity on the pressures within the lubricating fluid are almost negligible. Thus, referring now to FIG. 3, the pressures within FDB 300 are caused primarily by fluid flow. When rotor 320 is rotated with respect to stator 310, lubricating fluid 330 begins to flow with respect to stator bearing surface 315 as the rotor bearing surface 325 creates shear stresses within the fluid. The magnitude of these shear stresses, and as a result the speed of the fluid flow over stator bearing surface 315, increases as the viscosity of lubricating fluid 330 and the rotational speed of rotor 320 is increased. Consequently, areas of varying pressure are formed within lubricating fluid 330 as it flows over the features of journal bearing 340, upper thrust bearing 350, and lower thrust bearing 355.

Graph 305 in FIG. 3 shows the pressure distribution over the length of rotor bearing surface 325. Specifically, the graph between Point A' and Point F' shows the pressure created by journal bearing 340. The graph between Point G' to Point I' represents the pressure created by upper thrust bearing 350. And the pressure created by lower thrust bearing 355 is shown between Point J' and Point L'. Although the pressure gradients in FIG. 3 are shown as straight lines, they may in fact be arced or curved in another embodiment. Further, even though FIG. 3 shows a pressure gradient that never increases when moving from Point L' to Point A', the pressure gradient may increase in another embodiment so long as bubbles in lubricating fluid 330 are still directed to a desired location and not trapped. For example, vents may be employed in other embodiments as discussed above. The pressure gradients on either side of the vent may decrease such that bubbles are directed from the surrounding higher pressures toward the low pressure of the vent. Therefore, although the pressure gradient would not be always decreasing from Point L' to Point A' as shown in the pictured embodiment of FIG. 3, bubbles would still be directed to a desired location and not trapped.

Figure 7:
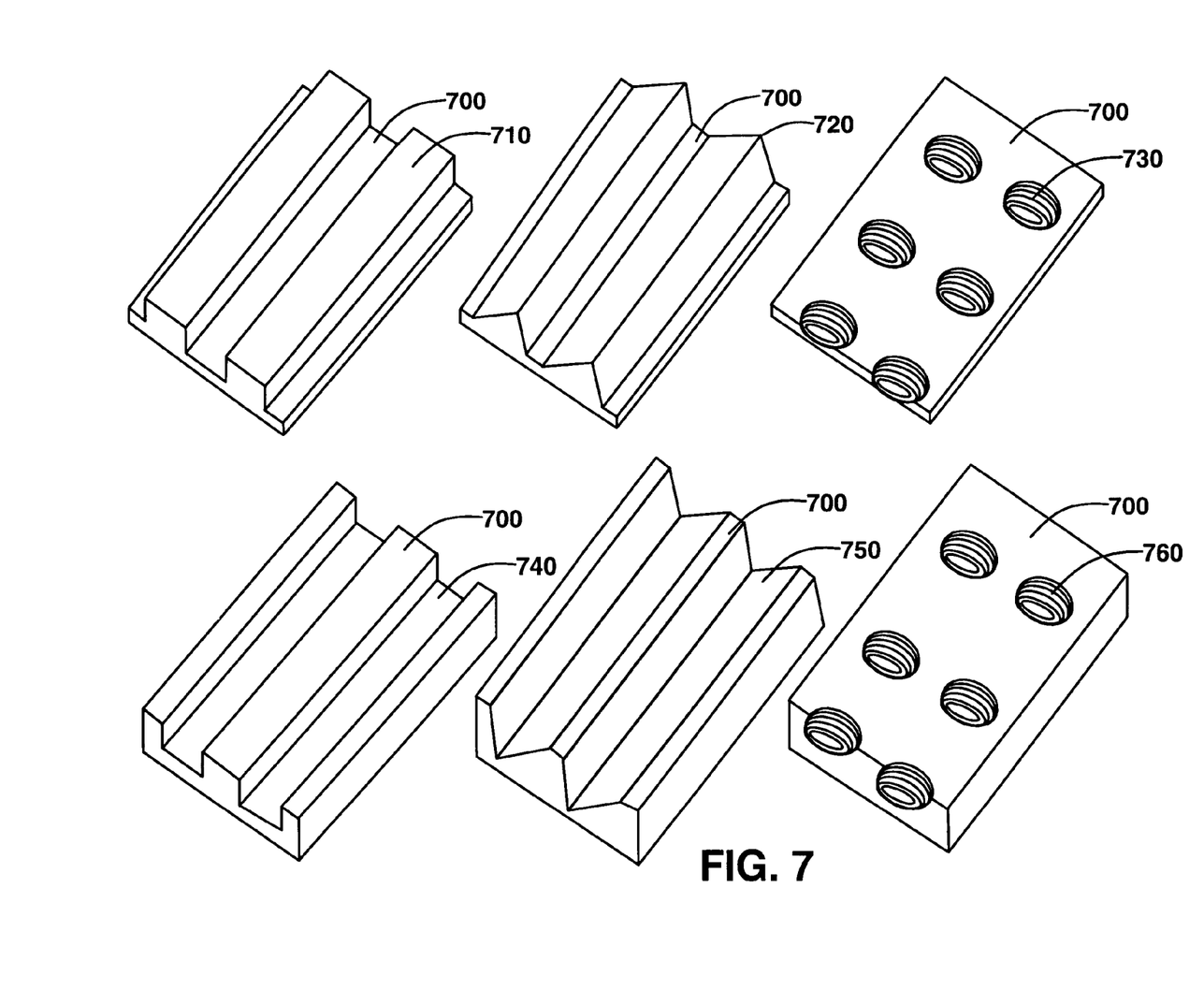
FIG. 7 is a perspective view of journal and thrust bearing features in accordance with several embodiments of the present invention.

Bubble direction within the FDB of the present invention is ultimately a result of fluid flow over the features on the stator bearing surface or rotor bearing surface. Although the journal and thrust bearing features may take many different forms in accordance with different embodiments of the present invention, FIG. 7 shows just a few of these embodiments. In one embodiment the features are lands disposed on substrate 700, as shown by rectangular or square lands 710, triangular lands 720, and hemispherical lands 730. In another embodiment the features are grooves or dimples disposed on substrate 700, as shown by rectangular or square grooves 740, triangular grooves 750, and hemispherical dimples 760. Although FIG. 3 shows these features disposed on stator bearing surface 315, these features may also be disposed in another embodiment on rotor bearing surface 325 as the viscosity of lubricating fluid 330 creates relative motion between lubricating fluid 330 and rotor bearing surface 325 necessary to generate the required operating pressures shown in the graph of FIG. 3. Thus, these embodiments allow significant manufacturing flexibility given the multitude of features possible, and the ability to place these features on either the stator or rotor bearing surfaces. And in other embodiments, these features may be disposed on both the stator and rotor bearing surfaces, although this is almost never implemented.

Figure 6:
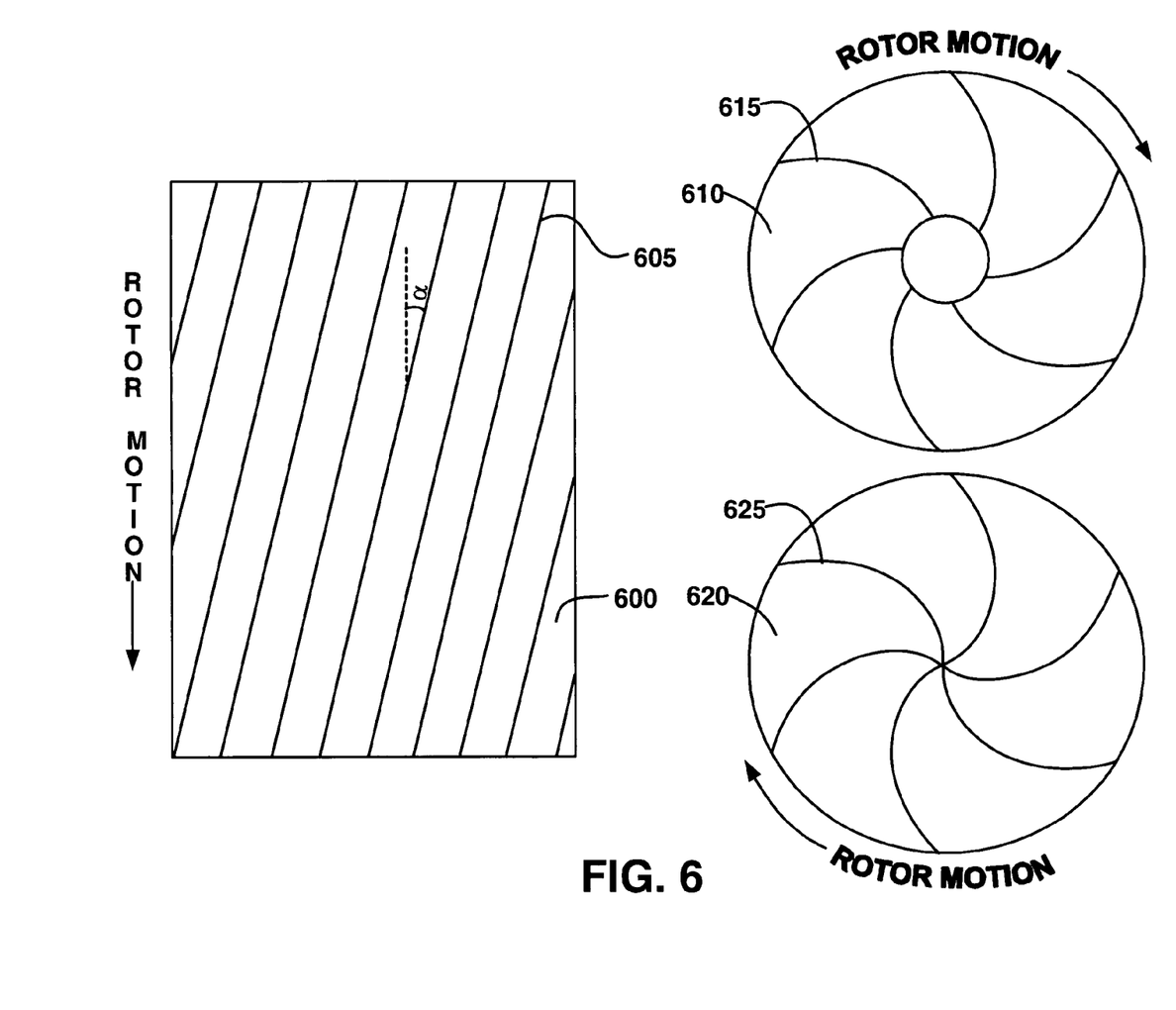
FIG. 6 is a projected view of a journal bearing surface, and a top view of an upper and lower thrust bearing surface, in accordance with one embodiment of the present invention.

In addition to the features themselves, bubble direction of the present invention is most strongly influenced by the arrangement of these features on the stator and rotor bearing surface. FIG. 6 shows one embodiment of the journal and thrust bearing surfaces used in the present invention. The lower thrust bearing is comprised of lower thrust bearing features 625 disposed on lower thrust bearing substrate 620. The upper thrust bearing is comprised of upper thrust bearing features 615 disposed on upper thrust bearing substrate 610. The journal bearing is comprised of journal bearing features 605 disposed on journal bearing substrate 600. In one embodiment shown in FIG. 6, the rotor bearing surface moves past the features disposed on the stator bearing surface. However, it should be understood that in another embodiment of the present invention, the features move past the stator bearing surface as they are disposed on the rotor bearing surface.

In the present embodiment, lower thrust bearing features 625 are arranged in a spiral orientation in FIG. 6. However, in other embodiments, lower thrust bearing features 625 may have slight waves, scallops, zig-zags, or the like, while still maintaining the overall spiraled arrangement. In another embodiment, lower thrust bearing features 625 may be arranged in more or less-tighter spiraled paths. In another embodiment, lower thrust bearing features 625 may be more or less numerous than shown in FIG. 6. Each of these variations will result in a slightly different pressure gradient over the lower thrust bearing surface in accordance with the embodiments discussed herein.

When the rotor bearing surface moves past lower thrust bearing features 625 as shown in FIG. 6, a pressure gradient is created similar to that in FIG. 3 from Point L' to Point J'. However, in other embodiments as described above, the pressure gradient may be altered by changing the path that lower thrust bearing features 625 describe. In general, the pressures at Point L' and Point J' may be raised by increasing the number of lower thrust bearing features 625. Conversely, if the number of lower thrust bearing features 625 is decreased, the pressures at Point L' and Point J' may be decreased. Also, the pressure gradient may be arced or curved by arranging lower thrust bearing features 625 in tighter spirals or less-tight spirals.

Upper thrust bearing features 615 are arranged in a spiral orientation in FIG. 6. However, in other embodiments, upper thrust bearing features 615 may have slight waves, scallops, zig-zags, or the like, while still maintaining the overall spiraled arrangement. In another embodiment, upper thrust bearing features 615 may be arranged in more or less-tighter spiraled paths. In another embodiment, upper thrust bearing features 615 may be more or less numerous than shown in FIG. 6.

When the rotor bearing surface moves past upper thrust bearing features 615 as shown in FIG. 6, a pressure gradient is created similar to that in FIG. 3 from Point I' to Point G'. However, in other embodiments as described above, the pressure gradient may be altered by changing the path that upper thrust bearing features 615 describe. In general, the pressures at Point I' and Point G' may be raised by increasing the number of lower thrust bearing features 615. Conversely, if the number of lower thrust bearing features 625 is decreased, the pressures at Point L' and Point J' may be decreased. Also, the pressure gradient may be arced or curved by arranging lower thrust bearing features 625 in tighter spirals or less-tighter spirals.

Journal bearing features 605 are linear and equidistant from one another in the present embodiment. However, in another embodiment journal bearing features 605 may describe, for example, a wavy, scalloped, or zig-zag path. In another embodiment journal bearing features 605 may not be parallel to one another. And in another embodiment, journal bearing features 605 may be more or less numerous than shown in FIG. 6.

When the rotor bearing surface moves past journal bearing features 605 as shown in FIG. 6, a pressure gradient is created similar to that in FIG. 3 from Point F' to Point A', with Point F' being the peak. However, in other embodiments as described above, the pressure gradient may be altered by changing the path that journal bearing features 605 describe. In general, as the groove angle α of journal bearing features 605 is varied between 0 degrees and 90 degrees, the peak of the pressure gradient will vary, but the pressure gradient will tend to remain uniform. If α is increased beyond 90 degrees up to 180 degrees, as occurs in the herringbone pattern used in the prior art, then the pressure gradient will be reversed.

As such, the journal and thrust bearings of the present invention function together to produce a monotone pressure gradient, as shown in graph 305 of FIG. 3. As discussed above, bubbles within a fluid are directed from areas of higher pressure to that of lower pressure. Thus, referring to graph 305, a bubble will be driven from Point L' to Point A' as the pressure never increases from Point L' to Point A' such that a bubble could be trapped. Moreover, although FIG. 3 shows the monotone pressure gradient to comprise regions of constant pressure gradient represented by straight lines, the pressure gradients in other embodiments of the present invention may not be linear. As discussed above, the regions may be shaped in any way, so long as the ability of the present invention to direct bubbles is not inhibited.

Therefore, the monotone pressure gradient of the present invention will successfully direct bubbles within the lubricating fluid to a desired location, without trapping any bubbles along the way. For example, as shown in FIG. 4, the monotone pressure gradient of the present invention will successfully direct bubbles 460/465 along the lower thrust bearing surface toward Point J', then along upper thrust bearing surface toward Point G', then along the journal bearing surface toward Point A' at the lubricating fluid-air interface. Although the lubricating fluid-air interface in FIG. 4 is the most desirable location to direct bubbles with the lubricating fluid, it is conceivable that other locations may be more desirable in other embodiments employing, for example, vents along either stator bearing surface 415 or rotor bearing surface 425. As such, other embodiments of the monotone pressure gradient may direct bubbles to other desired locations within a FDB in accordance with the operating principles discussed herein.

The alternative embodiment(s) of the present invention are thus described. While the present invention has been described in particular embodiments, it should be appreciated that the present invention should not be construed as limited by such embodiments, but rather construed according to the below claims.

What is claimed is:

1. A fluid dynamic bearing assembly for directing bubbles, said fluid dynamic bearing assembly comprising:
   a stator with a stator bearing surface;
   a rotor with a rotor bearing surface, wherein said rotor rotates with respect to said stator, and wherein said rotor bearing surface opposes said stator bearing surface;
   lubricating fluid disposed between said stator bearing surface and said rotor bearing surface; and
   features disposed on at least one of said rotor bearing surface and said stator bearing surface for directing said bubbles such that said fluid dynamic bearing assembly does not require a recirculation channel, wherein said features create a monotone pressure gradient along at least one of said rotor bearing surface and said stator bearing surface.

2. The fluid dynamic bearing assembly of claim 1, wherein said features are lands.

3. The fluid dynamic bearing assembly of claim 1, wherein said features are grooves.

4. The fluid dynamic bearing assembly of claim 1, wherein said features are dimples.

5. The fluid dynamic bearing assembly of claim 1, wherein said features create a pressure gradient along at least one of said rotor bearing surface and said stator bearing surface when said rotor rotates with respect to said stator, wherein said pressure gradient directs said bubbles to a desired location.

6. A fluid dynamic bearing surface for directing bubbles, said fluid dynamic bearing surface comprising:
   a substrate; and
   features coupled with said substrate, wherein fluid flow over said features creates a monotone pressure gradient along said fluid dynamic bearing surface, wherein said fluid dynamic bearing surface is at least one of a rotor bearing surface and a stator bearing surface, and wherein said pressure gradient directs said bubbles without requiring a recirculation channel.

7. The fluid dynamic bearing surface of claim 6, wherein said features are lands.

8. The fluid dynamic bearing surface of claim 6, wherein said features are grooves.

9. The fluid dynamic bearing surface of claim 6, wherein said features are dimples.

10. The fluid dynamic bearing surface of claim 6, wherein said features create a pressure gradient along at least one of said rotor bearing surface and said stator bearing surface when said rotor rotates with respect to said stator, wherein said pressure gradient directs said bubbles to a desired location.

11. A hard disk drive comprising:
    a housing;
    at least one disk coupled with said housing;
    an actuator assembly mounted to said housing, wherein said actuator assembly is coupled with an actuator arm, wherein said actuator arm is movable relative to said at least one disk, and wherein said actuator arm is coupled with a suspension arm for reaching over the disk;
    a slider coupled with said suspension arm, wherein said slider has a read/write head element thereon;
    a fluid dynamic bearing assembly coupled with at least one disk, said fluid dynamic bearing assembly comprising:
    a stator with a stator bearing surface;
    a rotor with a rotor bearing surface, wherein said rotor rotates with respect to said stator, and wherein said rotor bearing surface opposes said stator bearing surface;
    lubricating fluid disposed between said stator bearing surface and said rotor bearing surface; and
    features disposed on at least one of said rotor bearing surface and said stator bearing surface for directing bubbles such that said fluid dynamic bearing assembly does not require a recirculation channel, wherein said features create a monotone pressure gradient along at least one of said rotor bearing surface and said stator bearing surface.

12. The hard disk drive of claim 11, wherein said features are lands.

13. The hard disk drive of claim 11, wherein said features are grooves.

14. The hard disk drive of claim 11, wherein said features are dimples.

15. The hard disk drive of claim 11, wherein said features create a pressure gradient along at least one of said rotor bearing surface and said stator bearing surface when said rotor rotates with respect to said stator, wherein said pressure gradient directs said bubbles to a desired location.

16. A fluid dynamic bearing assembly for directing bubbles, said fluid dynamic bearing assembly comprising:
    stator means for providing a stator bearing surface;
    rotor means for providing a rotor bearing surface and for rotating with respect to said stator;

lubricating fluid means disposed between said stator bearing surface and said rotor bearing surface for allowing rotation of said rotor with respect to said stator, and for generating fluid flow with respect to at least one of said rotor bearing surface and said stator bearing surface; and feature means disposed on at least one of said rotor bearing surface and said stator bearing surface for creating a monotone pressure gradient along at least one of said rotor bearing surface and said stator bearing surface in response to said fluid flow over said features, wherein said pressure gradient directs said bubbles.

17. The fluid dynamic bearing assembly of claim 16, wherein said feature means create a pressure gradient along at least one of said rotor bearing surface and said stator bearing surface when said rotor rotates with respect to said stator, wherein said pressure gradient directs said bubbles to a desired location.

\* \* \* \* \*